Patented June 28, 1927.

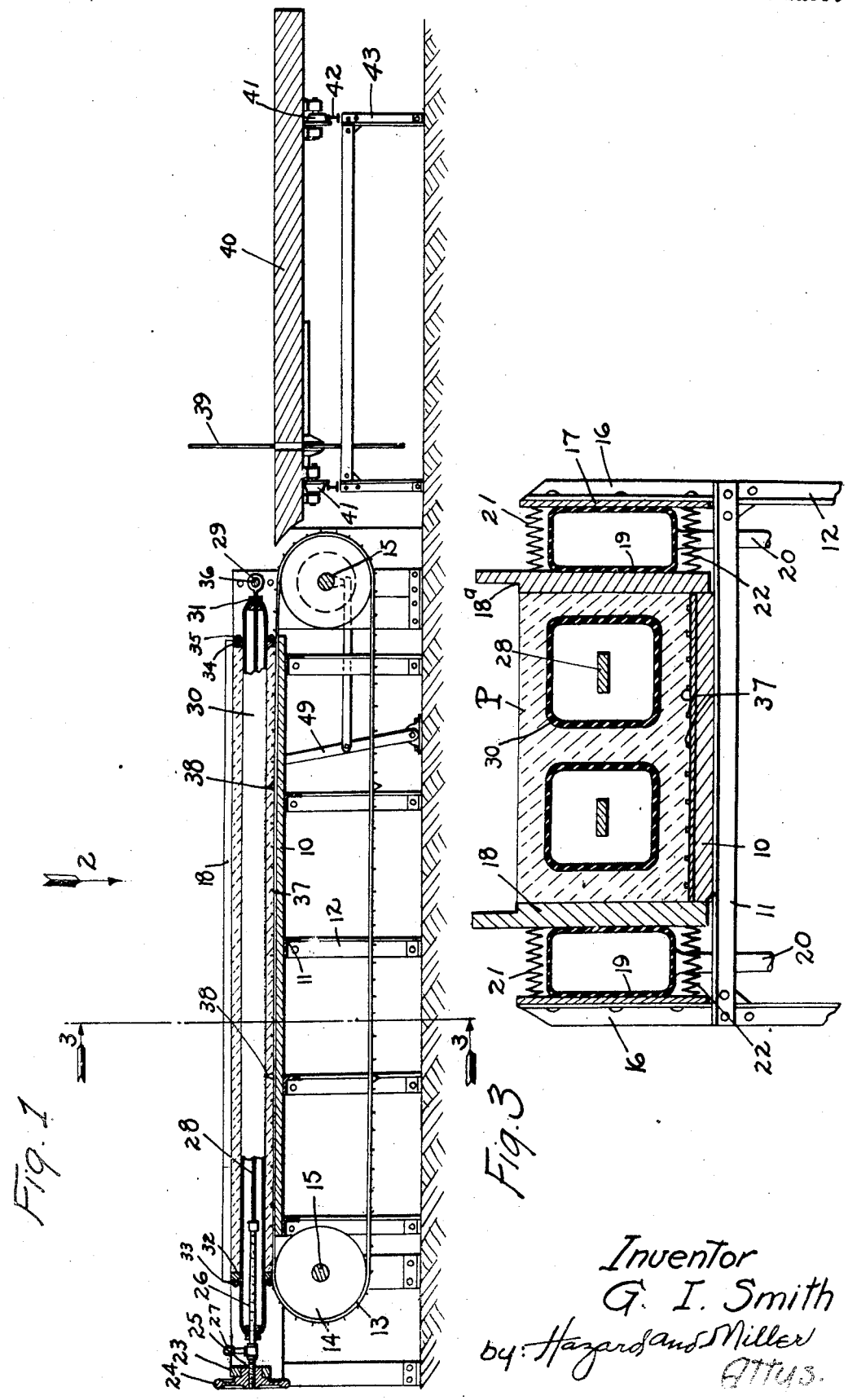

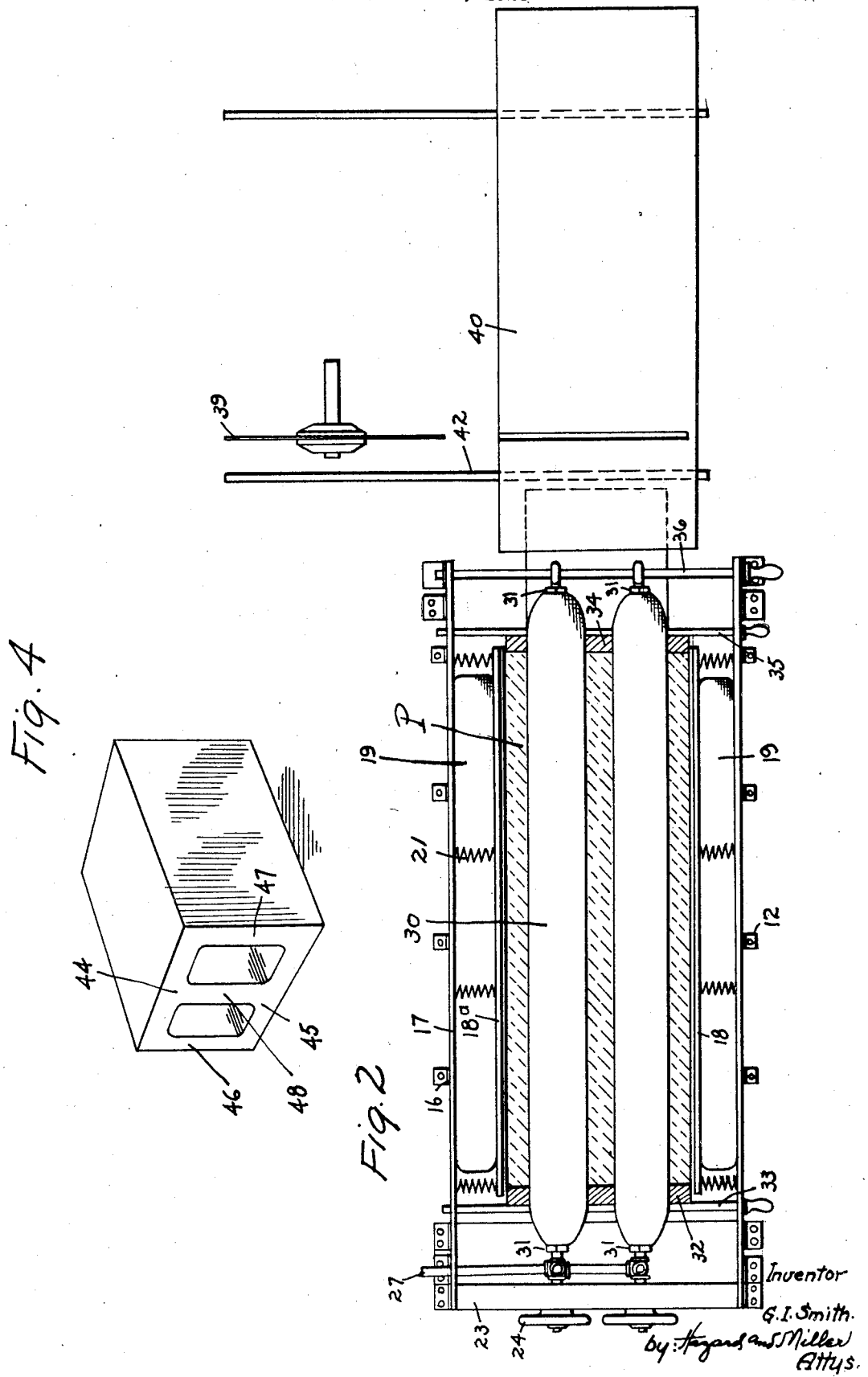

1,634,047

UNITED STATES PATENT OFFICE.

GEORGE I. SMITH, OF LOS ANGELES, CALIFORNIA.

MOLD.

Application filed June 4, 1925. Serial No. 34,820.

This invention relates to improvements in molds for molding plastic materials, and is especially adapted for molding gypsum and other sticky materials which are adapted to be molded into the form of hollow building blocks used in forming hollow wall constructions and the like.

An object of the invention is to provide a mold having collapsible or inflatable side walls and cores, permitting the side walls and the cores to be inflated while material is being placed in the mold, and assume the desired shape, and also permitting the cores to be collapsed and the side walls to be withdrawn easily from the molded article to facilitate its removal from the mold.

With the foregoing and other objects in view which will be made manifest in the following detailed description and specifically pointed out in the appended claims, reference is had to the accompanying drawings for an illustrative embodiment of the invention, wherein:

Figure 1 is a vertical section through the improved mold,

Fig. 2 is a top plan view of the improved mold,

Fig. 3 is a vertical section taken substantially on the line 3—3 of Fig. 1, and

Fig. 4 is a perspective view of the finished product.

Referring to the accompanying drawings wherein similar reference characters designate similar parts throughout, the improved mold consists of a mold bottom or table 10 supported upon transverse angle irons 11, which in turn are supported by legs 12. A portion of an endless belt 13 is disposed above the table 10 so as to be movable thereon. This endless belt extends over pulleys or rollers 14 which are rotatably mounted upon shafts 15. Above the legs 12 there are arranged stationary side structures 16, which may be formed of continuations of the legs 12. Against the parts 16 there are positioned panels 17 so as to form a continuous stationary side wall. Movable side walls are indicated at 18 and are disposed between the stationary side wall structures. These movable side walls are movable toward and away from the table 10 and the upper portion of the endless belt 13. Movable tubes 19 are arranged between each of the movable walls 18 and its respective stationary side structure. These tubes are preferably formed of rubber and may be covered with canvas so that they can be inflated and deflated by means of hose 20.

Coil springs 21 and 22 are fastened to the panels 17 and to the respective movable walls 18, the upper springs 21 preferably being stronger or stiffer than the lower springs 22. These coil springs tend to normally urge the movable walls 18 toward their respective stationary side wall structures. Adjacent one end of the mold there is a transverse support 23 on which are mounted hand wheels 24, which are interiorly threaded to receive screws 25. The screws 25 are connected to pipe sections 26. These pipe sections are perforated and are connected to a supply pipe 27. The inner ends of the pipe sections 26 are fastened to tension members 28 which have their remote ends provided with eyes 29. A collapsible tube 30 is secured about the pipe section 26 and the tension member 28 as by lock nuts 31. These tubes are capable of being inflated and deflated so that they constitute pneumatic or inflatable cores. An end wall 32 forms an end for the mold and has apertures therein to receive the ends of the pneumatic cores. This end wall is adapted to be maintained in position by means of removable transverse rods 33 which extend across the mold from one stationary side to the other. The other end wall 34 is of a similar construction and is adapted to be maintained in position by removable transverse rods 35, which are similar to the rods 33. A removable rod 36 is also adapted to extend transversely across the mold and extends through the eyes 29 on the tension members 28. On the endless belt 13 there are formed or otherwise secured buttons 37, and at suitable intervals there are arranged wedge shaped supports 38.

There is associated with the mold a circular saw construction having a circular saw 39 and a movable table 40 which has rollers 41 which roll upon rails 42 supported by a supporting structure 43.

The operation of the device is as follows: It will be readily understood that the object of the improved mold is to produce a building block such as is shown in Fig. 4, having a top 44 and a bottom 45, side walls 46 and 47, and a central web 48. The mold is assembled as shown in Figs. 1 and 2, and the tubes 19 and 30 are inflated, so that the collapsible cores are in extended or inflated position, and the movable side walls 18 engage the sides of the table 10 and the endless belt 37. The plastic material P is then placed into the mold between the movable side walls 18 and the end walls 32 and 34. The top of the plastic material is leveled off by moving a scraper or leveler along the shoulders 18ª on the movable side walls. When the plastic material has set, the hand wheels 24 are rotated to loosen the tension members 28 and the rod 36 is withdrawn. The end walls 32 and 34 can then be withdrawn upon removing the transverse rods 33 and 35. The pneumatic pressure within the tubes 19 and 30 is then released, and if desired a vacuum pump may be connected to the supply pipe 27 and to the hose 20, so as to form vacuums within the tubes 19 and 30. When the pressure is relieved within the tubes 19, the movable walls 18 are withdrawn from the sides of the plastic material P by means of the tension springs 21 and 22. As the upper springs 21 are stronger, the tops of the movable walls 18 will break away from the sides of the plastic material first, so that a tendency toward a peeling action in removing the removable sides 18 is produced. As the plastic material used in forming building blocks becomes quite fragile when set, this feature is quite important. When the pressure is relieved and a partial vacuum is formed within the tubes 30, these tubes tend to peel off of the inside of the molded column so that there will be a minimum tendency toward breakage. When the tubes 30 and the movable walls 18 have disengaged the plastic material, the endless belt can be caused to move by operating a clutch operable by a lever 49 causing the shaft 15 to rotate and move the endless belt. This moves the column from the belt to the table 40, and as it is transferred, the bottom peels off of the bottom 45 of the column. When the column is positioned on the movable table 40, it can be readily cut up by the circular saw 39 into the desired lengths.

In reassembling the mold, the end walls 32 and 34 are first replaced and the transverse rods 33 and 35 placed in position. The transverse rod 36 is extended through the eyes 29 and the hand wheels 24 are rotated to tighten the tension members 28. Placing a tension upon the tension member 28 tends to support the tubes 30 above the bottom of the mold or the conveyor belt 13. The wedge shaped supports 38 upon the conveyor belt also tend to keep the tubes 30 at the desired distance above the bottom.

By the improved construction it will be readily appreciated that an improved mold is formed having pneumatic or inflatable sides and cores, and that a column of building blocks can be molded at one time. Because of the inflatable core construction, no draft or taper on the core is necessary, so that a long column having cored openings therethrough of uniform size can be obtained.

It will be understood that various changes in the details of construction may be made without departing from the spirit or scope of the invention as defined by the appended claims.

I claim:

1. In a mold for plastic materials, a support, stationary side structures mounted thereon, movable wall structures movable upon the support, and inflatable members disposed between the stationary side structures and the movable wall structures.

2. In a mold for plastic materials, a support, stationary side structures mounted thereon, movable wall structures movable upon the support, inflatable members disposed between the stationary side structures and the movable wall structures, and spring means for urging the movable wall structures toward the stationary side structures.

3. In a mold for plastic materials, a support, stationary side structures mounted thereon, movable wall structures movable upon the support, inflatable members disposed between the stationary side structures and the movable wall structures, and inflatable cores disposed between the movable wall structures.

4. A mold for plastic materials comprising a support, a conveyor belt movable upon said support, stationary side structures mounted upon the support, movable wall structures associated therewith, and inflatable means associated with the side structures and the wall structures for producing movement of the wall structures.

5. A mold for plastic materials comprising a support, a conveyor belt movable upon said support, stationary side structures mounted upon the support, movable wall structures associated therewith, inflatable means associated with the side structures and the wall structures for producing movement of the wall structures, and spring means for urging the movable wall structures into a predetermined position.

6. A mold for plastic materials, having a bottom provided by a portion of an endless belt, said mold having inflatable vacuum cores and movable side walls.

7. In a mold for plastic materials, a support, having an endless belt thereon, a portion of said endless belt providing a bottom for said mold, movable wall structures mounted upon the support, and inflatable members providing cores disposed between the movable wall structures.

In testimony whereof I have signed my name to this specification.

GEORGE I. SMITH.